United States Patent [19]

Oefner

[11] Patent Number: 4,898,756
[45] Date of Patent: Feb. 6, 1990

[54] INSERT FOR A SANDWICH STRUCTURE

[75] Inventor: Walter Oefner, Otterfing, Fed. Rep. of Germany

[73] Assignee: Messerschmitt-Bölkow-Blohm GmbH, Munich, Fed. Rep. of Germany

[21] Appl. No.: 228,284

[22] Filed: Aug. 4, 1988

[30] Foreign Application Priority Data

Aug. 5, 1987 [DE] Fed. Rep. of Germany ...... 3725974

[51] Int. Cl.$^4$ ............................................. F16B 19/04
[52] U.S. Cl. .................................. 428/34.1; 411/500; 428/36.9; 428/131; 428/596
[58] Field of Search ..................... 428/596, 34.1, 36.9, 428/36.92, 131; 411/500, 508, 509, 510

[56] References Cited

U.S. PATENT DOCUMENTS 4,647,264  3/1987  Pamer et al. ........................ 411/338
4,770,582  9/1988  Junemann et al. .................. 411/508

Primary Examiner—Ellis P. Robinson
Assistant Examiner—James J. Seidleck
Attorney, Agent, or Firm—Kenyon & Kenyon

[57] ABSTRACT

A hollow insert for a sandwich structure having at least one fixed head on a substantially hollow cylindrical shank with a bore through the shank, the head being eccentric relative to the shank, with a corresponding eccentricity of the opening of the bore of the shank in the head, the eccentricity securing the insert against rotation in the structure.

21 Claims, 1 Drawing Sheet

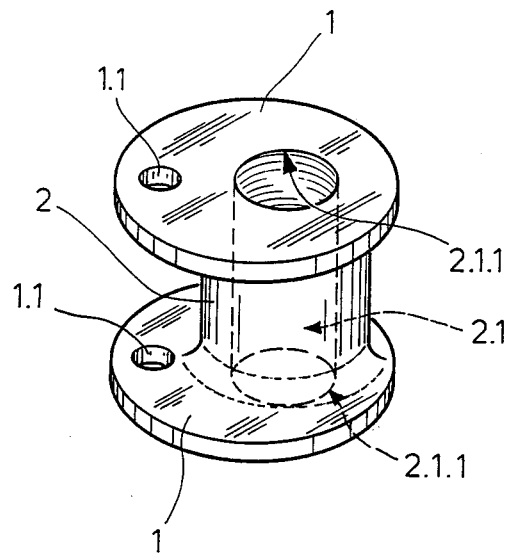

INSERT FOR A SANDWICH STRUCTURE

The present invention relates to an insert which provides a screw connection means for use in sandwich metal or composite structures.

BACKGROUND OF THE INVENTION

Sandwich plate structures are common and known in such fields as aircraft and ship manufacture. Such structures can be comprised of two thin metallic or composite layers laminated onto a foam core. It is often necessary to attach various objects to these structures by means of screws. Such screws cannot be drilled through and fastened directly to the structure. The usual practice has been to drill a hole through the structure and then place an insert, usually metal with an axial bore, into the hole. The screw can then be inserted through the bore and attached to the structure.

The inserts used for these screw connections have several failings. In particular, they are prone to rotation within the structure, with consequent negative effects on the structure. Anchoring clamps have been used to prevent such rotation, but these are expensive and rely on the structure's skin to hold the insert in place.

When such clamps are too expensive or when the inserts must be installed flush with the metal or composite skins of the structure, direct "press fitting" of the inserts into holes drilled in the structure has been used. This has the disadvantage that only the structure's core prevents the insert from rotating. The skins of the structure do not grip the insert and are therefore unloaded.

SUMMARY OF THE INVENTION

It is an object of the present invention to provide an insert which may simply be embedded in a sandwich core structure, flush to the skin if desired, which has a co-rotation safety design which prevents transmission of rotary movements to the insert, without the necessity of separately anchoring the inserts.

It is a further object of this invention to provide a co-rotation safety design for an insert which will not need to be press-fitted into the structure.

To achieve the aforementioned objects, the present invention comprises a shank with a concentric bore therethrough and two heads, affixed to the respective ends of the shank, the heads being attached eccentrically to the shank so that the concentric bore of the shank extends eccentrically through the heads.

In a further embodiment of the present invention, the bore through the shank may itself be eccentric to the central axis of the shank. The heads are then located upon the shank so that their degree of eccentricity to the bore is greater than the bore's eccentricity relative to the shank.

Thus, the anti-rotation design of the present invention shifts the anti-rotation load to the head of the insert, without excluding the use of known anti-rotation measures in the shank.

Other and further objects of this invention will become obvious upon an understanding of the illustrative embodiments about to be described with reference to the FIGURE or will be indicated in the appended claims, and further advantages not referred to herein will occur to one skilled in the art upon employment of the invention in practice.

DESCRIPTION OF THE FIGURE

The FIGURE depicts in perspective the insert provided in accordance with the invention.

DETAILED DESCRIPTION OF THE INVENTION

Referring to the FIGURE, an insert according to the present invention is shown which, for use as a screw connection means, may be insertable into a sandwich plate structure whose thickness is the same as the height of the insert. The insert is secured against rotation by the present invention. If the sandwich plate structure (not shown) has, for example, a core of foam material between two cover skins of aluminum, the anti-rotational securing of the insert occurs primarily at the cover skins. For this reason the insert is provided with fixed heads 1, arranged eccentrically on hollow cylindrical shank 2.

The eccentricity of heads 1 relative to shank 2 is such that orifices 2.1.1 of shank 2's concentric bore 2.1 extend eccentrically into heads 1. Thus bore 2.1 is concentric with relation to shank 2, but eccentric with relationship to heads 1. The bore can be formed as a continuous threaded bore.

To use the insert in a sandwich plate structure, a bore equal in diameter to the diameter of heads 1 must be drilled through the sandwich structure. The insert is then placed within this bore until the heads are flush with the cover skins. To insure the proper anchoring of the insert, the cavities around shank 2 are filled with expandable foam through passages 1.1 in heads 1. Thus the insert is secured against rotation by the press fit of the heads into and against the cover skins and against axial movement by the foam about shank 2.

Greater protection against the insert's rotation can be achieved by press-fitting shank 2 into the sandwich plate's core. Alternatively, bore 2.1 might be drilled eccentrically into shank 2. If this is done, the eccentricity of orifices 2.1.1 of bore 2.1 relative to heads 1 should be greater than the eccentricity of bore 2.1 to shank 2.

In terms of construction, the insert may be comprised of metal, plastic, composite materials or a combination thereof.

As many apparently widely different embodiments of this invention may be made without departing from the spirit and scope thereof, it is to be understood that the invention is not limited to the specific embodiments thereof except as defined in the appended claims.

What is claimed is:

1. An insert for use in sandwich structures comprising a circular shank with a concentric bore, at least one circular head fixed eccentrically to the shank, the bore of the shank being continued through the head, the bore being eccentric to the head.

2. The insert of claim 1 wherein the insert is comprised of plastic.

3. The insert of claim 1 wherein the insert is comprised of a composite material.

4. The insert of claim 1 wherein the insert is comprised of metal.

5. The insert of claim 1 wherein the insert is used as a fastening element and the bore is a threaded bore, so that said insert can be inserted into a sandwich plate structure for securing a screw to said sandwich plate structure in said threaded bore.

6. The insert of claim 1, further comprising an additional head opposite the first head fixed eccentrically to the shank with the bore of the shank extending through said head and disposed eccentric to the additional head.

7. The insert of claim 1, further comprising an additional opening disposed in said head for injecting foam into a cavity between said insert and said sandwich structure.

8. An insert for use in sandwich structures, the insert comprising a shank with an eccentric bore therethrough, at least one head fixed eccentrically to the shank, the bore of the shank extending through the head, the bore being eccentric to the head.

9. The insert of claim 8, wherein the insert is comprised of plastic.

10. The insert of claim 8, wherein the insert is comprised of a composite material.

11. The insert of claim 8, wherein the insert is comprised of metal.

12. The insert of claim 8, wherein the insert is used as a fastening element and the bore is a threaded bore, so that said insert can be inserted into a sandwich plate structure for securing a screw to said sandwich plate structure in said threaded bore.

13. The insert of claim 8, further comprising an additional head disposed opposite the first head fixed eccentrically to the shank with the bore of the shank extending through said head and disposed eccentric to the additional head.

14. The insert of claim 8, further comprising an additional opening disposed in said head for injecting foam into a cavity between said insert and said sandwich structure.

15. An insert comprising a shank with at least one head affixed eccentrically thereto, the shank having a concentric bore, the bore extending through the head, the bore being eccentric to the head.

16. The insert of claim 15, wherein the insert is comprised of plastic.

17. The insert of claim 15, wherein the insert is comprised of a composite material.

18. The insert of claim 15, wherein the insert is comprised of metal.

19. The insert of claim 15, wherein the insert is used as a fastening element and the bore is a threaded bore, so that said insert can be inserted into a sandwich plate structure for securing a screw to said sandwich plate structure in said threaded bore.

20. The insert of claim 15, further comprising an additional head disposed opposite the first head fixed eccentrically to the shank with the bore of the shank extending through said head and disposed eccentric to the additional head.

21. The insert of claim 15, further comprising an additional opening disposed in said head for injecting foam into a cavity between said insert and said sandwich structure.

* * * * *